(12) United States Patent
Burch et al.

(10) Patent No.: US 12,429,441 B2
(45) Date of Patent: Sep. 30, 2025

(54) HIGH THROUGHPUT DRUG DISCOVERY PLATFORM WITH TEM

(71) Applicants: California Institute of Technology, Pasadena, CA (US); The Regents of the University of California, Oakland, CA (US)

(72) Inventors: Jessica Burch, Los Angeles, CA (US); Hosea Nelson, Pasadena, CA (US); Lee Joon Kim, Pasadena, CA (US); David Delgadillo, Pasadena, CA (US)

(73) Assignees: California Institute of Technology, Pasadena, CA (US); The Regents of the University of California, Oakland, CA (US)

( * ) Notice: Subject to any disclaimer, the term of this patent is extended or adjusted under 35 U.S.C. 154(b) by 460 days.

(21) Appl. No.: 18/094,105

(22) Filed: Jan. 6, 2023

(65) Prior Publication Data
US 2023/0213463 A1    Jul. 6, 2023

Related U.S. Application Data

(60) Provisional application No. 63/297,179, filed on Jan. 6, 2022.

(51) Int. Cl.
| | | |
|---|---|---|
| *G01N 23/20* | (2018.01) | |
| *G01N 1/42* | (2006.01) | |
| *G01N 23/20008* | (2018.01) | |
| *G01N 23/20058* | (2018.01) | |
| *G01N 35/10* | (2006.01) | |

(52) U.S. Cl.
CPC ......... *G01N 23/20058* (2013.01); *G01N 1/42* (2013.01); *G01N 23/20008* (2013.01); *G01N 35/10* (2013.01); *G01N 2223/05* (2013.01); *G01N 2223/102* (2013.01); *G01N 2223/3103* (2013.01)

(58) Field of Classification Search
CPC .............. G01N 23/20058; G01N 1/42; G01N 23/2008; G01N 35/10; G01N 2223/05; G01N 2223/102; G01N 2223/3103
See application file for complete search history.

(56) References Cited

U.S. PATENT DOCUMENTS

| | | | |
|---|---|---|---|
| 2003/0198997 A1* | 10/2003 | Von Dreele | G01N 23/207 435/7.1 |
| 2010/0105901 A1* | 4/2010 | Fujita | C09K 19/3475 544/181 |
| 2023/0057900 A1* | 2/2023 | Nelson | G01N 23/2055 |

FOREIGN PATENT DOCUMENTS

WO    WO-2021055219 A1    3/2021

OTHER PUBLICATIONS

Danelius et al., "MicroED in natural product and small molecule research." Natural product reports, 38(3): 423-431. (2021).
Huang et al., "Three-dimensional electron diffraction for porous crystalline materials: structural determination and beyond." Chemical Science, 12(4): 1206-1219. (2021).
International Search Report and Written Opinion for Application No. PCT/US2023/010311 dated Mar. 23, 2023.

(Continued)

*Primary Examiner* — Nicole M Ippolito
(74) *Attorney, Agent, or Firm* — Foley Hoag LLP; David P. Halstead; Alexander J. Chatterley

(57) ABSTRACT

The present disclosure relates to methods of obtaining electron diffraction data of microcrystalline samples.

20 Claims, 8 Drawing Sheets

Computer-controlled, on-grid microarray deposition of two types of crystalline material producing distinct diffraction patterns

(56) References Cited

OTHER PUBLICATIONS

Martynowycz et al., "Ligand incorporation into protein microcrystals for MicroED by on-grid soaking." Structure, 29(1), 88-95. (2021).
Wang et al., "A Porous Cobalt Tetraphosphonate Metal-Organic Framework: Accurate Structure and Guest Molecule Location Determined by Continuous Rotation Electron Diffraction." Chemistry—A European Journal, 24(66): 17429 17433 (2018).
Martynowycz et al. "Efficient, high-throughput ligand incorporation into protein microcrystals by on-grid soaking," bioRxiv, May 25, 2020 accessed via <https://www.biorxiv.org/content/10.1101/2020.05.25.115246v1>.

* cited by examiner

Computer-controlled, on-grid microarray
deposition of two types of crystalline material
producing distinct diffraction patterns Drop of Protein Suspension
+
Drop Stain

|—— 3 mm ——|

Drop of Protein Suspension
+
Drop of Reactant
+
Drop of Stain

HIGH THROUGHPUT DRUG DISCOVERY PLATFORM WITH TEM

CROSS-REFERENCE TO RELATED APPLICATIONS

This application claims the benefit of priority to U.S. Provisional Patent Application No. 63/297,179, filed Jan. 6, 2022, the contents of which are expressly incorporated by reference herein in their entirety.

BACKGROUND

A detailed understanding of molecular structure, including the interactions between biomolecules and small molecule compounds, is critical for the development of scientific hypotheses in a broad range of fields. This includes understanding of drug-target interactions, which allows scientists to develop novel pharmaceuticals capable of treating human diseases.

Computational advancements have allowed chemists to model many of these interactions; however, atomic-resolution crystal structures are the gold-standard method to unambiguously obtain information about small molecules, proteins, and their interactions by empirical means. Traditionally, these types of species are studied by single crystal X-ray diffraction (SCXRD). The bottleneck for analysis by SCXRD is the growth of large, single crystals, which need to be greater than 125,000 $\mu m^3$ for in-house X-ray diffractometers, and 1,000 $\mu m^3$ for samples analyzed by synchrotron X-ray facilities. Generation of these crystals is quite challenging and often requires extensive, time-consuming screening of crystallization conditions. This screening may not be possible in cases where little material is available, or samples may generate crystals of unsuitable dimensions for analysis by SCXRD. In addition, the trial-and-error nature of crystallization means that, in practice, many samples fail to produce any suitable crystalline material in a reasonable timeframe.

Recently, the method microcrystal electron diffraction (microED) was developed for the analysis of small molecules, proteins, and drug-protein complexes. This technique allows for use of microcrystals, approximately ~1 $\mu m^3$ or less in size for crystallographic analysis. These microcrystals may be present in failed SCXRD trials or even present in seemingly amorphous powders. Given the challenge of growing large, high quality crystals, a technique called "crystal soaking" was developed for SCXRD to study drug-protein interactions without the need for additional crystallization trials. This method places crystals of the native protein species into a solution containing the small molecule analyte. While this method has allowed for the elucidation of some drug-protein complexes, poor diffusion of the drug into the large single crystal can present a challenge for unambiguous assignment of the small molecule by SCXRD. A recent report from Gonen et al. demonstrates that diffusion of small molecule analytes into protein microcrystals is improved, relative to that of typical SCXRD, due to the ability to sample smaller crystals with microED.

The miniaturization of crystallographic analysis through use of microED overcomes many physical limitations seen in crystallography; however, the requirement for growth of crystals can still be limiting. To obtain crystal structures of small molecules that may fail to produce crystals in a reasonable amount of time, researchers have developed the "crystalline sponge" technique utilizing metal-organic frameworks (MOFs). These MOFs are crystallized and contain large pores capable of encapsulating small molecule analytes. While the small molecule analyte may not readily grow crystals in the solid state, it may coordinate to the crystalline MOF matrix in an ordered fashion. The structure of the crystalline sponge and guest molecule can then be solved to obtain a solid state structure of the small molecule compound. This is an identical strategy to the soaking of protein crystals with drug candidates: the analyte coordinates to the crystalline material and a crystal structure of the complex can then be obtained.

While miniaturization of crystallographic analysis through use of microcrystals and microED has overcome some challenges faced in obtaining structures of challenging-to-crystallize small molecules, proteins, and drug-protein complexes, extensive, time-consuming screening is typically still required. As such, there exists an unmet need to reduce the time required to screen samples and increase throughput of data collection.

SUMMARY OF THE INVENTION

In certain aspects, this disclosure combines microarraying technology with microED to perform high-throughput analysis of drug-protein interactions, as well as soaking of crystalline sponges with small molecules to obtain crystal structures from samples that do not readily crystallize.

More specifically, this disclosure places microcrystals of proteins or crystalline sponges onto a transmission electron microscope (TEM) grid, and then performs a high-throughput screening of analytes and solvent conditions utilizing existing microarray technology. This creates a high throughput crystallization experiment on a single TEM grid, which can then be inserted and rapidly screened utilizing microED for diffraction.

DETAILED DESCRIPTION OF THE INVENTION

M. W. Martynowycz and T. Gonen, 2021 demonstrated on-grid soaking of protein microcrystals with small molecule ligands, as disclosed in M. W. Martynowycz & T.

Figure 1:
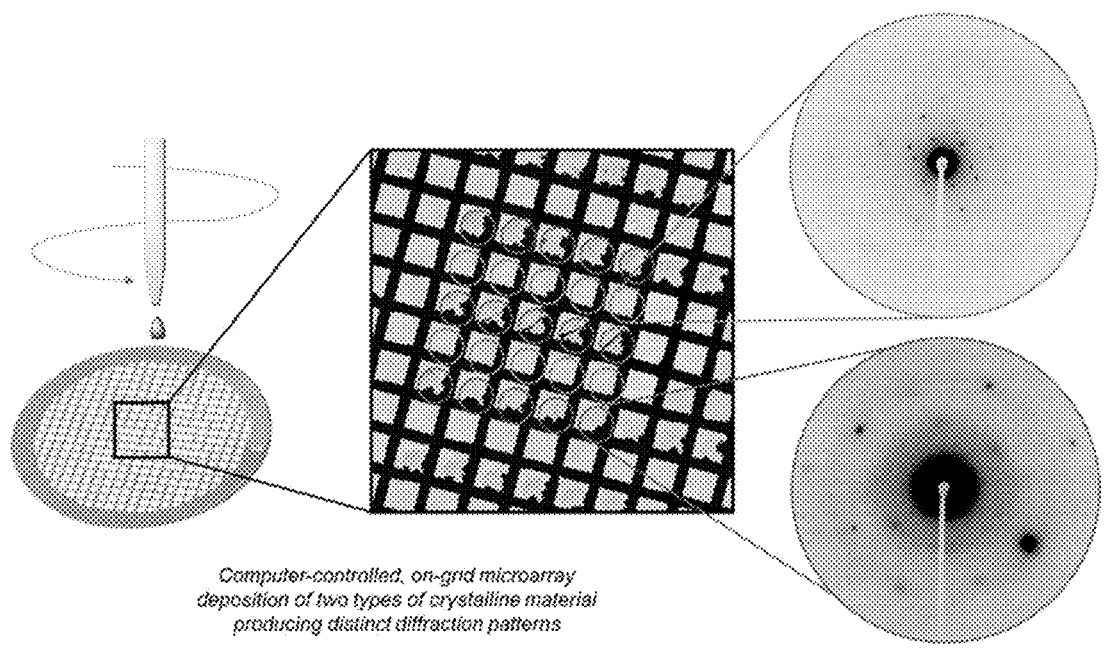
FIG. 1 shows a graphical overview of certain embodiments of the methods of the disclosure.

Gonen *Structure* 2021, 28, 88-95. While this approach enables simultaneous soaking of multiple microcrystals with a ligand solution, it is limited to one protein and ligand pair per grid. The technology described herein enables high-throughput screening of proteins and their small molecule ligands for drug discovery, as well as small molecule analytes with crystalline sponges. Utilizing a microarrayer (an automated sampling device that can add or remove controlled volumes of mixtures as droplets, for example, an autosampler), hundreds of isolated nanodroplets containing protein or crystalline sponge samples can be deposited onto a single grid. This is outlined in FIG. 1, which demonstrates the use of on-grid microarrayer technology to precisely deposit nanodroplets of microcrystals, which can subsequently be screened for diffraction in a TEM.

In certain embodiments, the methods of the disclosure comprise the following steps:

(a) Depositing protein microcrystals onto a grid, followed by blotting away the solvent in a high humidity environment;

(b) Incubating the microcrystals with ligand solution, followed by blotting away the solvent;

(c) Plunge-freezing the grid in a cryogenic liquid (liquid ethane and/or liquid nitrogen); (d) Inserting the grid into an electron microscope and collecting diffraction data.

In (a), protein crystals grown from high-throughput crystallization screens can be deposited onto a grid. In certain embodiments, this is done by a microarrayer. In certain embodiments, utilizing a continuous carbon or holey carbon TEM grid with 200 or 400 mesh, 43-450 picoliter droplets containing suspensions or solutions of samples can be individually deposited as a single isolated droplet within an array (FIG. 3). The TEM grids can be prepared with or without prior plasma discharge to tune the hydrophilicity of the TEM grid. After deposition, solvent can either be maintained through reduced temperature and high humidity, blotted away with standard electron microscopy preparation techniques, or allowed to evaporate to dryness. In certain embodiments, each protein sample is deposited as a single isolated nanodroplet in an array. The excess solvent may be blotted away in a high humidity environment to preserve the hydration state of proteins. A single protein analyte can be utilized in the crystallization screen, or multiple differing protein suspensions can be deposited for a combinatorial screen.

Figure 2A:
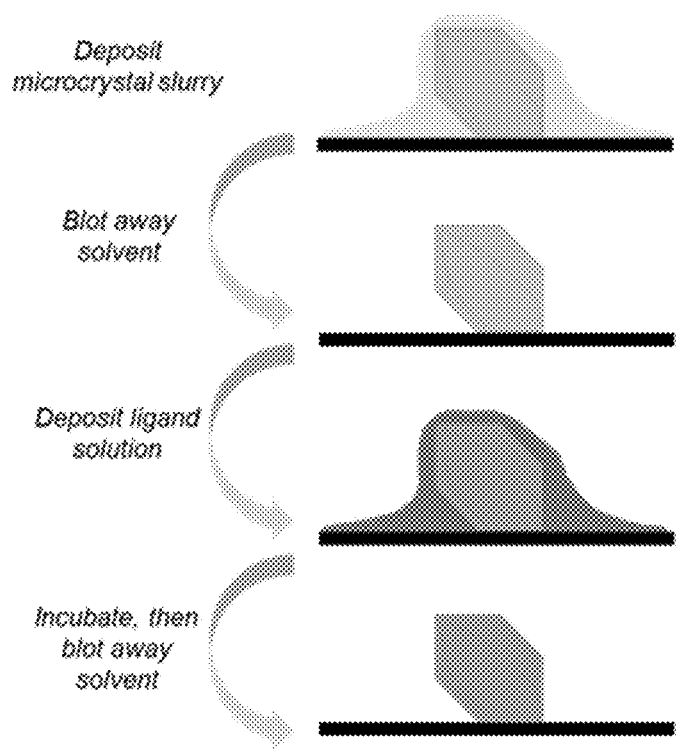
FIG. 2A is a graphical representation of an exemplary sequence of steps for on-grid incubation of protein or crystalline sponge microcrystals with ligand solution.

In certain embodiments, once the protein microcrystals are loaded on the grid, the microarrayer performs drop-on-drop deposition to accurately initiate a high-throughput soaking experiment (e.g., FIG. 3). This similarly involves deposition of protein or small molecule solution or suspension, on top of the previously deposited droplets. (e.g., FIG. 2A, FIG. 3). This could contain a single ligand with varying solvent conditions, multiple ligands in a single solvent, multiple ligands in multiple solvents, or a library of ligands in varying solutions. After incubating the protein microcrystals with the ligand solution(s), the excess solution will be blotted away, or negatively stained and allowed to evaporate to dryness.

Figure 2B:
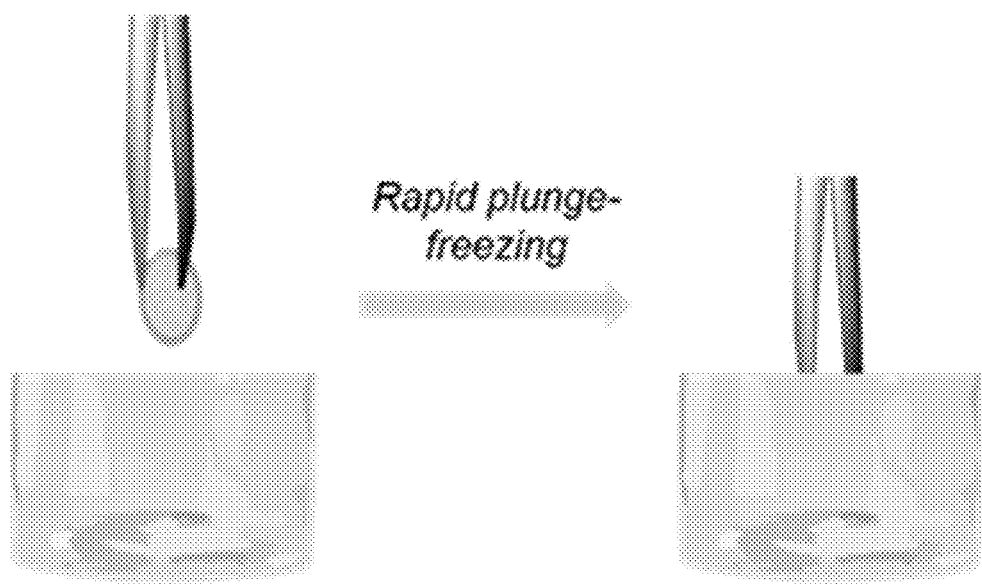
FIG. 2B is a graphical representation of plunge-freezing the grid in cryogenic liquid.

In certain embodiments, in step (c), the entire grid is frozen by submerging the grid in a cryogenic liquid such as liquid ethane or liquid nitrogen (e.g., FIG. 2B). This process captures the proteins in a hydrated environment in various orientations, as well as attenuate the radiation damage from the high-energy electron beams.

Figure 2C:
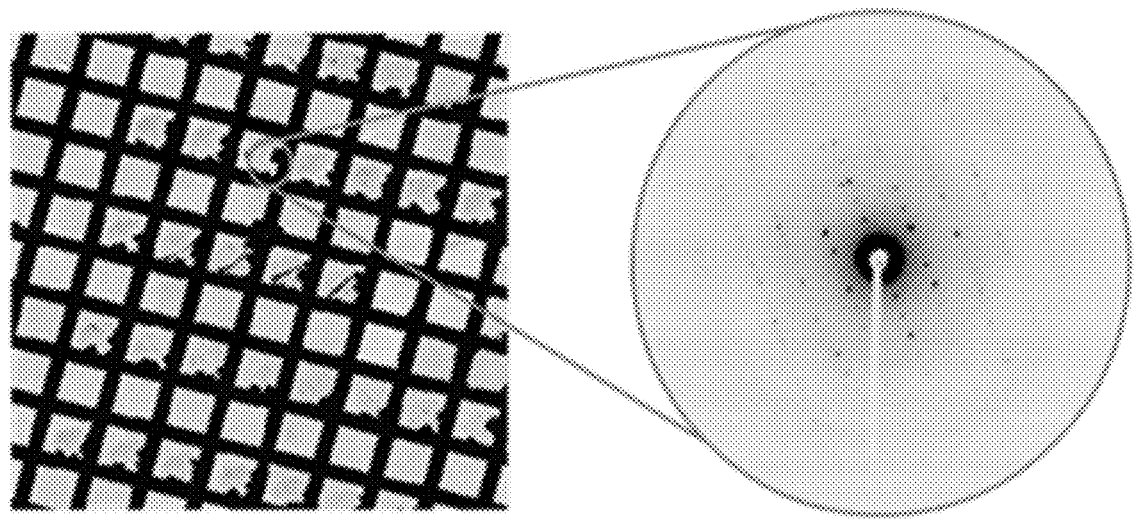
FIG. 2C is a graphical representation of screening a sample for diffraction data in an electron microscope (exemplary diffraction pattern inset).
Figure 3A:
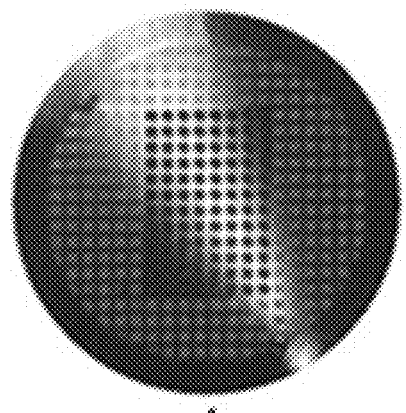
FIG. 3A shows 200-450 picoliter droplets deposited individually onto a standard continuous carbon, 200 mesh TEM grid.
Figure 3A:
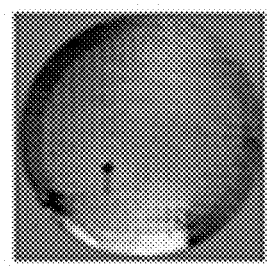
Figure 3A:
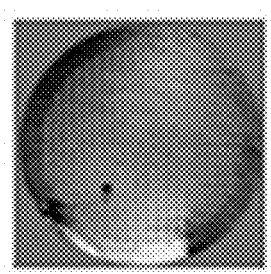
Figure 3A:
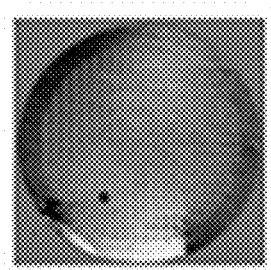
Figure 3A:
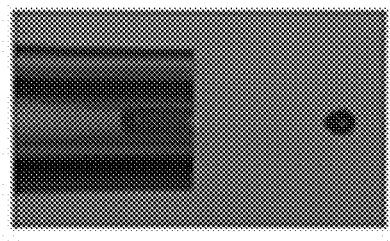
Figure 3B:
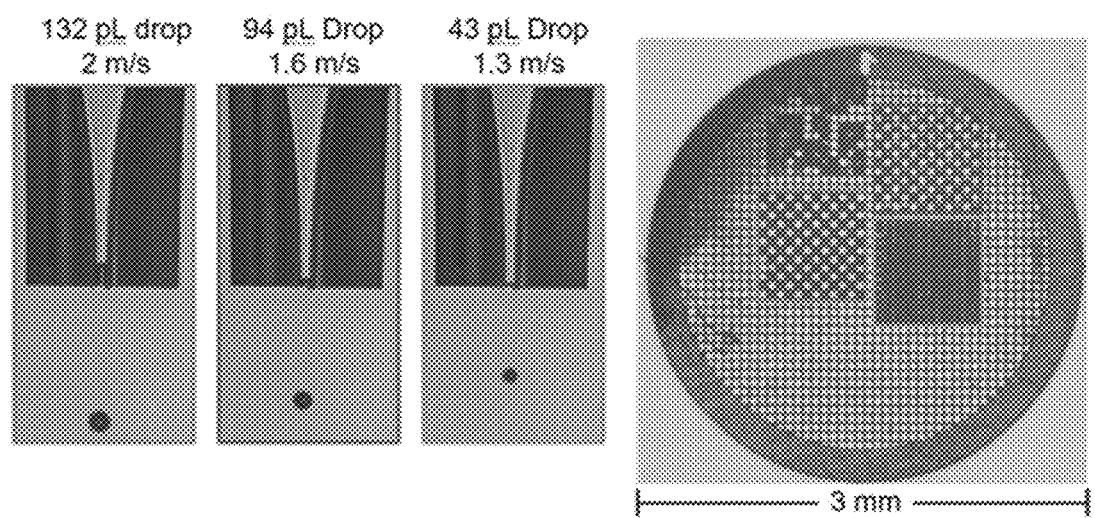
FIG. 3B shows drop size optimization to deposit 12×12 arrays of individual droplets onto a 400 mesh continuous carbon TEM grid.
Figure 4:
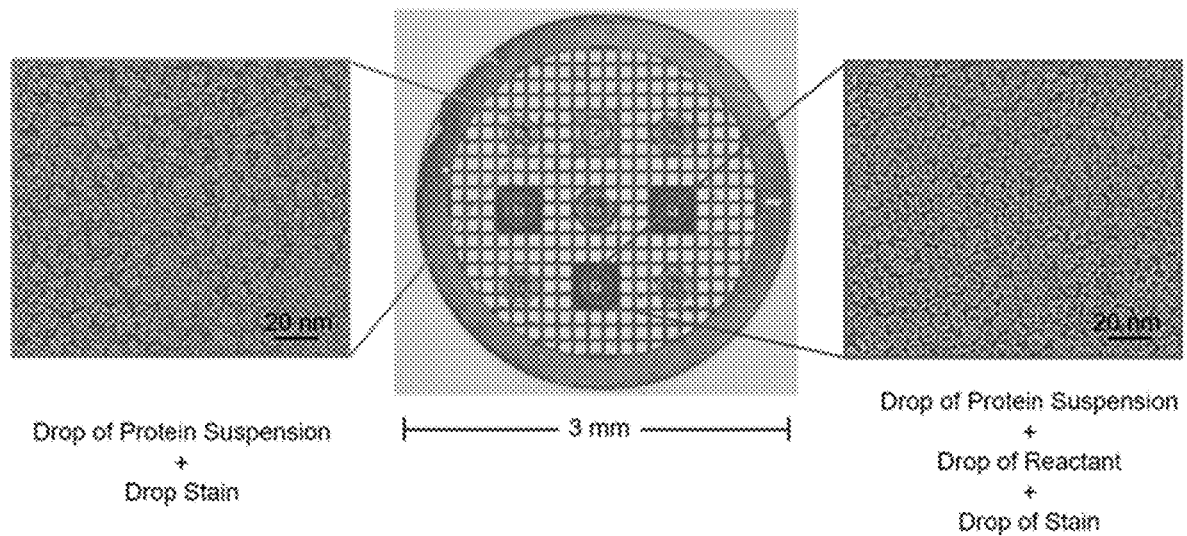
FIG. 4 shows drop-on-drop experiment utilizing a 9×9 droplet array on a holey carbon grid and analyzed utilizing cryoEM imaging.
Figure 5:
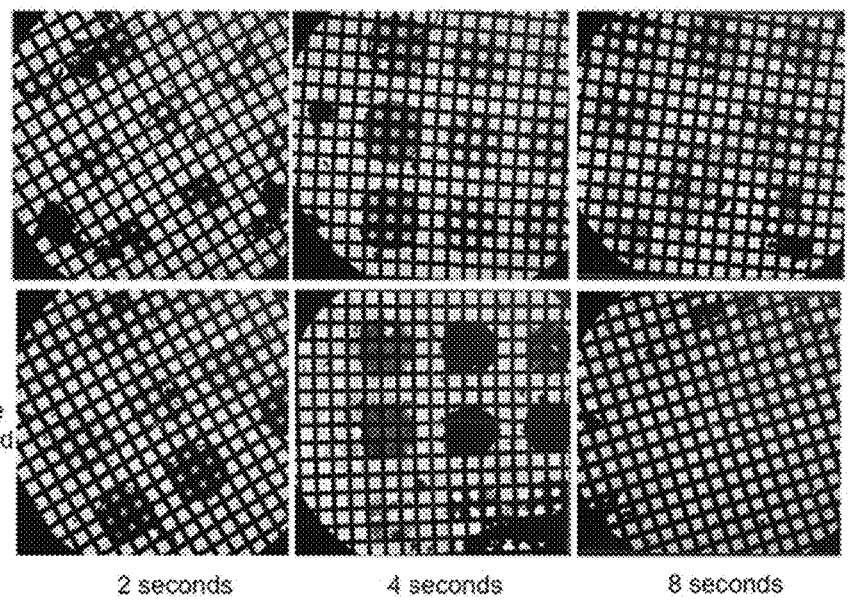
FIG. 5 shows screening of microarrayed protein solution for vitrified ice thickness by traditional cryoEM methodology.

In certain embodiments, in (d), the frozen grid is inserted into a TEM under cryogenic conditions, through use of a cryogenic sample holder and standard cryo transfer processes. After insertion into a TEM, diffraction data can be collected according to standard electron diffraction methods (e.g., FIG. 2C, FIG. 5).

In certain embodiments, the presently disclosed methods comprise the following steps:

(a) Depositing crystalline sponge microcrystals onto a grid, followed by blotting or evaporation of residual solvent (b) Incubating the microcrystals with small molecule guest solution, followed by blotting or evaporation of the solvent;

(c) Inserting the grid into an electron microscope and collecting diffraction data, or;

(c) Plunge-freezing the grid in cryogen (liquid ethane and liquid nitrogen);

(d) Insertion of the frozen grid into an electron microscope and collecting diffraction data.

In certain embodiments, in step (a), crystalline sponge crystals are deposited onto a grid. In certain embodiments, this is performed by the microarrayer. Each crystalline sponge will be deposited as a single isolated nanodroplet in an array. The excess solvent is blotted away or evaporated. A single crystalline sponge can be utilized in the crystallization screen, or multiple differing crystalline sponge suspensions can be deposited for a combinatorial screen.

Once the crystalline sponge microcrystals are loaded on the grid, the microarrayer will deposit a small molecule guest solution on top of the crystalline sponge microcrystals. This could contain a single guest with varying solvent conditions, multiple guests in a single solvent, multiple guests in multiple solvents, or a library of guests in varying solutions. After incubating the crystalline sponge microcrystals with the ligand solution(s), the excess solution will be blotted away or removed by evaporation.

After incubation with guest solution, the grid may be either directly inserted into the TEM at room temperature with diffraction data collected according to standard electron diffraction methods without solvation, or;

The grid can be frozen in a cryogenic liquid such as liquid ethane or liquid nitrogen by plunging the grid into the cryogenic liquid. This process can capture the crystalline sponges in a hydrated environment in various orientations, as well as attenuate the radiation damage from the high-energy electron beams.

In certain embodiments, the frozen grid can be inserted into a TEM while being kept under cryogenic conditions (e.g., by keeping the grid in a stream of the cryogenic liquid while data is collected), through use of a cryogenic sample holder and standard cryo transfer processes. After insertion into a TEM, diffraction data will be collected according to standard electron diffraction methods.

In certain embodiments, the microcrystal(s) may be of a single protein analyte of interest, and the ligand solution may comprise a mixture of multiple ligands, or a complex mixture/library of ligands.

In certain embodiments, the methods of the disclosure may include treating multiple proteins (i.e., multiple microcrystals) with a single ligand of interest.

In certain embodiments, the methods of the disclosure may be used to perform/study the following: treat a single protein with multiple solvent soaking conditions for a single, or multiple ligand(s); evaluating multiple crystalline sponges for ordered uptake of guest molecule of interest; screening multiple guest solvent conditions on a single crystalline sponge type; and screening a single crystalline sponge with a complex mixture of guest molecules of interest

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well known and commonly used in the art.

The methods and techniques of the present disclosure are generally performed, unless otherwise indicated, according to conventional methods well known in the art and as described in various general and more specific references that are cited and discussed throughout this specification.

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C.A. (1985).

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

The term "crystalline sponge" as used herein refers to a crystalline organometallic framework that has been used in the "crystalline sponge method" of obtaining crystallographic data of small molecules. For example, see methods and compositions described in N. Zigon, V. Duplan, N. Wada, M. Fujita, *Angew. Chem. Int. Ed.* 2021, 60, 25204. As a non-limiting example, crystalline sponges of the disclosure may have the formula $\{[(ZnI_2)_3(tpt)_2] \cdot x(solvent)\}_n$ (tpt=tris(4-pyridyl)-1,3,5-triazine), wherein the "solvent" is water or an organic solvent.

The term "microcrystals" as used herein is used to refer to a substantially singly-crystalline species that is less than about 100 μm and preferably less than about 50 μm in size across its largest span, edge, and/or face.

As used herein, the term "small molecule" refers to molecules with a molecular weight less than about 1,000 Daltons.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A method of obtaining electron diffraction data of a sample comprising:
   depositing a microcrystal mixture into a microscopy grid, wherein the microcrystal mixture comprises at least one microcrystal and a liquid phase;
   removing the liquid phase from the at least one microcrystal;
   contacting the at least one microcrystal with a ligand solution for an incubation period, wherein the ligand solution comprises one or more small molecules and a ligand solution solvent;
   removing the ligand solution solvent;
   immersing the microscopy grid into a cryogenic liquid;
   contacting the microscopy grid with an electron beam of an electron source such that the electron beam is incident upon the at least one microcrystal, and
   collecting electron diffraction data of the at least one microcrystal;
   wherein each at least one microcrystal is selected from a crystalline biological macromolecule, crystalline bio-mimetic macromolecule, crystalline organic polymer, and crystalline organometallic framework.

2. The method of claim 1, wherein the at least one microcrystal is a crystalline biological macromolecule.

3. The method of claim 2, wherein the crystalline biological macromolecule is a polypeptide.

4. The method of claim 2, wherein the crystalline biological macromolecule is an antibody.

5. The method of claim 2, wherein the crystalline biological macromolecule is an enzyme.

6. The method of claim 1, wherein the at least one microcrystal is a crystalline bio-mimetic macromolecule.

7. The method of claim 1, wherein at least one microcrystal is a crystalline organic polymer.

8. The method of claim 1, wherein the at least one microcrystal is a crystalline organometallic framework.

9. The method of claim 8, wherein the crystalline organometallic framework is selected from a crystalline sponge, metal-organic framework (MOF), and zeolitic imidazolate framework (ZIF).

10. The method of claim 9, wherein the crystalline organometallic framework is a crystalline sponge.

11. The method of claim 1, wherein the small molecule is an active pharmaceutical ingredient (API).

12. The method of claim 1, wherein the small molecule is an organic molecule.

13. The method of claim 1, wherein the ligand solution comprises a mixture of different small molecules.

14. The method of claim 1, wherein the cryogenic liquid is liquid nitrogen.

15. The method of claim 1, wherein the cryogenic liquid is liquid ethane.

16. The method of claim 1, wherein the method is performed by an automated device configured to add and remove set volumes of liquids via pipette.

17. The method of claim 1, wherein depositing the microcrystal mixture comprises depositing at least one droplet, having a droplet volume of from about 30 picoliters (pL) to about 500 pL into the microscopy grid.

18. The method of claim 1, wherein the microscopy grid is 200 mesh or 400 mesh.

19. The method of claim 1, wherein removing the liquid phase from the at least one microcrystal comprises blotting away the liquid phase.

20. The method of claim 1, wherein removing the liquid phase from the at least one microcrystal comprises evaporating the liquid phase.

* * * * *